Oct. 5, 1937.   F. G. CURTIN   2,095,127
BALL COCK
Filed March 12, 1935

Witness
Paul F. Bryant

Inventor
Frank G. Curtin
by his attorneys
Fish, Hildreth, Cary & Jenney

Patented Oct. 5, 1937

2,095,127

UNITED STATES PATENT OFFICE 2,095,127

BALL COCK

Frank G. Curtin, Medford, Mass.

Application March 12, 1935, Serial No. 10,628

2 Claims. (Cl. 137—104)

The present invention relates to ball cocks and more particularly to ball cocks of the general type disclosed in the patents to Andrew F. Curtin Nos. 1,179,507 and 1,840,309, dated April 18, 1916 and January 12, 1932, respectively.

The ball cocks disclosed in the prior patents involving the spiral or helical flow of water around the valve plunger are particularly satisfactory from the standpoint of quiet and reliable operation. They are, however, open to the objection that since the water flows in a helical path around the plunger, only a portion of the surface thereof is wetted and the surface may become non-uniformly corroded along the helical path, thereby roughening the plunger after long use and detracting from its ease of movement. Furthermore, the helical course of the water gives a vertical component of force which tends to hold the valve open, a factor of some importance with the small floats now used in narrow tanks.

The principal object of the present invention is to provide improvements in the ball cocks of the above-mentioned patents, particularly with a view to avoiding corrosion effects and also reducing the force necessary to operate the valve. Another object of the invention is to provide further improvements in the construction of the ball cock whereby the relatively expensive operation of coring the helical path may be avoided.

With these objects in view, the present invention contemplates the provision of a stationary sleeve surrounding the valve plunger whereby the water in its helical course through the body of the ball cock does not come into contact with the plunger. By this means, the vertical force due to the water in motion is not permitted to act on the plunger and consequently the ball cock may be operated with a comparatively small float. Furthermore, any corrosion that occurs forms on the external surface of the sleeve where it is of no practical consequence. In a modification of the invention, the helical water passage is formed on the sleeve itself, thereby avoiding the necessity of coring the passage in the body of the ball cock.

Figure 1:
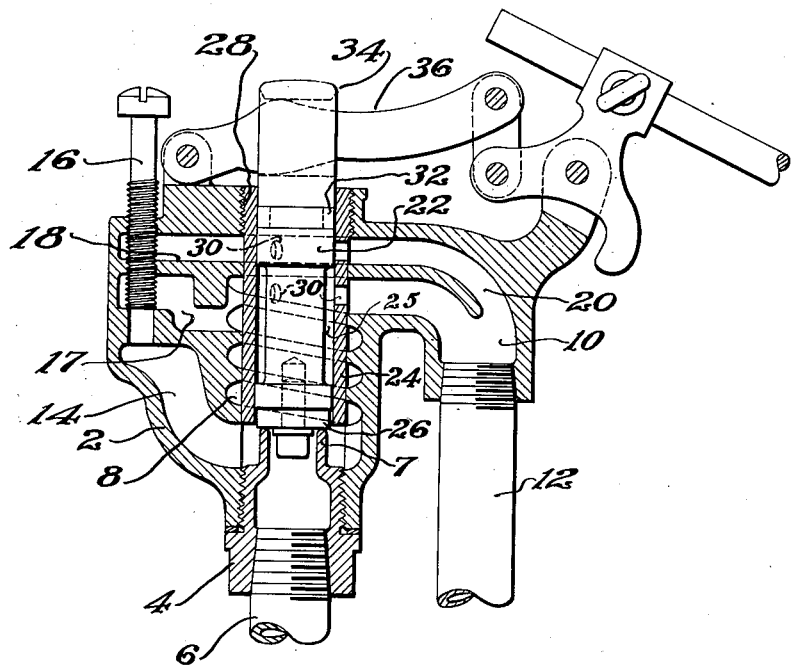
Figure 2:
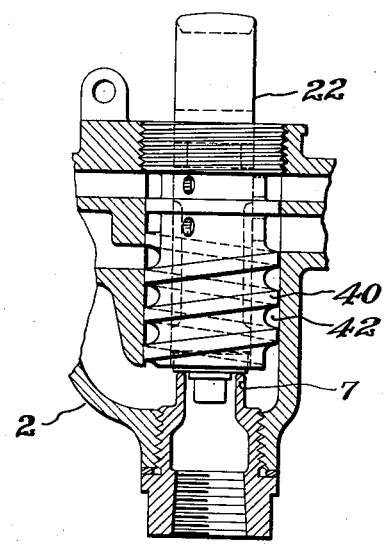

In the accompanying drawing, Fig. 1 is a sectional elevation of one form of ball cock embodying the present invention, and Fig. 2 is a sectional elevation of a modified form of ball cock.

The ball cock shown in Fig. 1 comprises the cast shell or body 2 having at the bottom a fitting 4 connected with the supply pipe 6 of any suitable form. The fitting has a valve seat 7 at the upper end. The valve body is formed with a spiral or helical water passage 8 leading to the outlet 10 which connects with the hush tube 12. A by-pass chamber 14 controlled by an adjusting screw 16 leads to the enlarged passage 17 at the top of the helical passage 8. Separated from the passage 17 by a partition 18 is an aspirating passage 20 in which sub-atmospheric pressure is maintained by the action of the water flowing into the outlet 10, the purpose being to prevent leakage of water outwardly through the top of the body. The parts thus far described are substantially identical with similar parts described in the Curtin Patent No. 1,840,309.

Received within the body is a vertically movable valve plunger 22 surrounded by a stationary sleeve 24, the outside diameter of the sleeve being approximately the same as the outside diameter of the plunger in the above-mentioned Curtin patent. The plunger 22 of the present invention is consequently somewhat smaller than the plunger of the prior patent.

The plunger is preferably turned down to a smaller diameter between its ends, as indicated at 25, to permit free movement of the plunger and to prevent sticking of the plunger by deposits from hard water. The plunger has at the bottom a leather washer 26 received in a suitable socket formed in the bottom of the plunger. The sleeve 24 is secured within the body by a threaded connection 28 or other suitable means and is so positioned that the bottom of the sleeve is flush with the lowermost portion of the spiral passage, as indicated in the drawing. The sleeve has near the upper end one or more openings 30 disposed in each of the passages 17 and 20.

The plunger 22 is provided with a ring washer 32 to fit closely within the sleeve 24. The plunger is formed at the top with a head 34 connected with the linkage 36, whereby the ball cock may be opened by the usual hand lever and closed by the action of the float.

When the plunger is lifted for a flushing operation, the greater part of the water entering from the supply pipe 6 courses through the helical passage 8, and a small part of the water may be by-passed through the passage 14, depending on the setting of the screw 16. The flow of water is exactly as in the ball cock shown in the Curtin Patent No. 1,840,309. During its flow through the helical passage, however, the water contacts only with the exterior of the sleeve and not with the plunger. The provision for contact of the water with the sleeve, rather than the plunger, accomplishes the important result of avoiding undesirable corrosion.

Any corrosion that may occur is localized in a helical curve on the surface of the sleeve, and is inconsequential because the sleeve is stationary. There is little or no opportunity for corrosion of the plunger by leakage of water into the space between the plunger and the sleeve, and any such water is quickly exhausted through the openings 30 leading into the recess 25 because of the relatively low pressure at these points due to the motion of the water.

It will be noted that the vertical component of force due to the water moving in a helical passage acts only on the stationary sleeve and therefore cannot resist the closing movement of the plunger. Accordingly, the ball cock may be operated with a float of relatively small size.

In the modified form of the invention shown in Fig. 2, the action is identical with that of the modification above described. The construction differs, however, in that the helical passage is formed in the exterior surface of the stationary sleeve rather than in the body of the valve. The sleeve, which is indicated at 40, is therefore of somewhat greater external diameter than the sleeve 24 of Fig. 1. The helical passages 42 are formed in the sleeve, the opening in the body being cylindrical. So far as the flow of water is concerned, the passages are identical with those of Fig. 1. The internal diameter of the sleeve 40 is the same as that of the sleeve 24 of the first modification and the plunger 22 is mounted therein to operate in identical fashion. This form of the invention has the constructional advantage of avoiding the difficult casting required in the other form.

Having thus described the invention, what is claimed is:

1. A ball cock valve having, in combination, a body provided with an inlet and an outlet chamber, a valve seat in the inlet, a valve plunger movable toward and from the valve seat longitudinally of the body, and a stationary sleeve surrounding the valve and engaged externally by the body between the inlet and outlet, the sleeve and body being formed to provide a circulating water passage to conduct water from the inlet chamber to the outlet chamber, the body having an aspirating chamber connected with the outlet, and the sleeve having an opening into the aspirating chamber to exhaust water by suction from the interior of the sleeve.

2. A ball cock valve having in combination, a body provided with an inlet and an outlet chamber, a valve seat in the inlet, a valve plunger movable toward and from the valve seat longitudinally of the body, and a stationary sleeve surrounding the valve and engaged externally by the body between the inlet and outlet, the plunger being of smaller diameter at the middle than at the ends to form a space between the plunger and the sleeve, the sleeve and body being formed to provide a circulating water passage to conduct water from the inlet chamber to the outlet chamber, the sleeve having an opening in the side wall adjacent to the outlet chamber for exhausting water from said space between the plunger and sleeve.

FRANK G. CURTIN.